United States Patent
Lawson et al.

(10) Patent No.: US 7,662,457 B2
(45) Date of Patent: Feb. 16, 2010

(54) WOOD COMPOSITE MATERIAL CONTAINING STRANDS OF DIFFERING DENSITIES

(75) Inventors: Eric N. Lawson, Hull, GA (US); Nian Ou, Dacula, GA (US); Brian M. Peek, Cornelia, GA (US)

(73) Assignee: Huber Engineered Woods LLC, Charlotte, NC (US)

( * ) Notice: Subject to any disclaimer, the term of this patent is extended or adjusted under 35 U.S.C. 154(b) by 494 days.

(21) Appl. No.: 11/426,436

(22) Filed: Jun. 26, 2006

(65) Prior Publication Data

US 2007/0296108 A1 Dec. 27, 2007

(51) Int. Cl.
*B32B 5/12* (2006.01)

(52) U.S. Cl. ............... 428/105; 428/106; 428/107; 428/292.4; 428/537.1

(58) Field of Classification Search .......... 428/292.4, 428/218, 537.1, 110, 215, 337, 334, 105, 428/106, 107
See application file for complete search history.

(56) References Cited

U.S. PATENT DOCUMENTS

| | | | |
|---|---|---|---|
| 3,164,511 A * | 1/1965 | Elmendorf | 428/110 |
| 3,881,984 A | 5/1975 | Soda et al. | |
| 3,977,449 A | 8/1976 | Sadashige | |
| 4,361,612 A * | 11/1982 | Shaner et al. | 428/106 |
| 5,059,466 A | 10/1991 | Blumer | |
| 5,439,749 A * | 8/1995 | Klasell et al. | 428/537.1 |
| 6,011,205 A | 1/2000 | Tucker et al. | |
| 6,043,350 A | 3/2000 | Roll et al. | |
| 6,098,679 A * | 8/2000 | Go et al. | 144/361 |
| 6,129,871 A | 10/2000 | Suzuki et al. | |
| 6,569,540 B1 | 5/2003 | Preston et al. | |
| 6,737,155 B1 * | 5/2004 | Ou | 428/292.4 |
| 6,773,552 B1 | 8/2004 | Albert et al. | |
| 7,547,488 B2 * | 6/2009 | Dimakis et al. | 429/105 |
| 2003/0035921 A1 | 2/2003 | Kornicer et al. | |
| 2003/0042180 A1 | 3/2003 | Kairi | |
| 2003/0150189 A1 | 8/2003 | Ou et al. | |
| 2003/0203998 A1 | 10/2003 | Gres | |
| 2003/0204988 A1 | 11/2003 | Bransby et al. | |
| 2005/0006003 A1 | 1/2005 | Yokoo et al. | |
| 2005/0140038 A1 | 6/2005 | Frienser | |
| 2005/0153150 A1 * | 7/2005 | Wellwood et al. | 428/537.1 |
| 2006/0142428 A1 | 6/2006 | Lawson et al. | |
| 2007/0296108 A1 * | 12/2007 | Lawson et al. | 264/109 |

FOREIGN PATENT DOCUMENTS

| | | |
|---|---|---|
| GB | 1469276 | 4/1977 |
| JP | 2000271907 | 9/1997 |
| JP | 9244625 | 10/2000 |

* cited by examiner

*Primary Examiner*—N. Edwards
(74) *Attorney, Agent, or Firm*—Gardner Groff Greenwald & Villanueva, PC

(57) ABSTRACT

Disclosed is a wood composite material comprising: wood strands disposed in surface layers and one or more core layers, whereby an intermediate density divides the wood strands so that the two surface layers of strands are more dense than the intermediate density, and the one or more core layers of the strands are less dense than the intermediate density, and wherein the core layer contains at least about 70 wt % of the strands that are less dense than the intermediate density; and the surface layers contain at least about 70 wt % of the strands that are more dense than the intermediate density.

13 Claims, No Drawings

WOOD COMPOSITE MATERIAL CONTAINING STRANDS OF DIFFERING DENSITIES

BACKGROUND OF THE INVENTION

Wood is a common material used to construct doors and other architectural building elements. Even today, after the development of several new species of composite materials, wood remains one of the most widely-used structural materials because of its excellent strength and stiffness, pleasing aesthetics, good insulation properties and easy workability.

However, in recent years the cost of solid timber wood has increased dramatically as its supply shrinks due to the gradual depletion of old-growth and virgin forests. It is particularly expensive to manufacture doors from such material because typically less than half of harvested timber wood is converted to natural solid wood lumber, the remainder being discarded as scrap.

Accordingly, because of both the cost of high-grade timber wood as well as a heightened emphasis on conserving natural resources, wood-based alternatives to natural solid wood lumber have been developed that make more efficient use of harvested wood and reduce the amount of wood discarded as scrap. Plywood, particle board and oriented strand board ("OSB") are examples of wood-based composite alternatives to natural solid wood lumber that have replaced natural solid wood lumber in many structural applications in the last seventy-five years. These wood-based composites not only use the available supply of timber wood more efficiently, but they can also be formed from lower-grade wood species, and even from wood wastes.

However, decreasing wood supplies and lower wood quality are putting increasing stress on the quality of and raw material prices for OSB. Wood species often must be mixed in the process in order to have enough wood to make continuing supply of composite panels. If these species are of differing densities, there are problems with the mixing of them in the panel. For example, if a clump of one species or the other were to form in the panel due to inadequate mixing in the process, then the area of the clumped species would have a density that is either higher or lower than the overall average density of the panel. This could cause visual and structural problems with the panel since lower density clumped material may form a weak spot and high density clumped material may cause a stronger and harder area which may be harder to sand. Given the foregoing, there is a continuing need for a wood composite material that can address these inadequacies. Notably this wood composite material would have superior or comparable performance to solid wood lumber while being lighter (lower density) than conventional mixed-species OSB materials, have a more uniform appearance and more consistent physical properties. Additionally, this wood composite material would incorporate to some extent fibers harvested from *lignocellulosic* species that are faster growing than those species which are conventionally used for wood composite materials.

Examples of such faster growing *lignocellulosic* species include tree species from the genus *Paulownia*, as well as trees grown on managed (irrigation and fertilization) plantations. Examples of non-tree *lignocellulosic* materials include annual and perennial grasses such as wheat straw and the various species of bamboo. These can be grown and harvested very quickly after planting, and can give a more frequent harvest schedule than that of typical tree species. Additionally, these species would be mixed into a wood composite material in such a way that the strengths of the materials would be emphasized while the weaknesses of the materials would be minimized for the final product. Mixing a small amount of a superior material into a wood composite in this manner would serve to maximize the value of the superior material while at the same time conserving it, especially if the material was in short supply or was expensive to procure.

BRIEF SUMMARY OF THE INVENTION

The present invention relates to a wood composite material comprising: wood strands disposed in surface layers and one or more core layers, whereby an intermediate density divides the wood strands so that the two surface layers of strands are more dense than the intermediate density, and the one or more core layers of the strands are less dense than the intermediate density, and wherein the core layer contains at least about 70 wt % of the strands that are less dense than the intermediate density; and the surface layers contain at least about 70 wt % of the strands that are more dense than the intermediate density.

According to one aspect of this embodiment the wood composite board has a density of about 20 lbs/ft$^3$ to about 60 lbs/ft$^3$.

The present invention also relates to a method for producing a wood composite material comprising the steps of: providing a quantity of wood strands; dividing the wood strands, based on an intermediate density, so that a first group of the strands are less dense than the intermediate density, and a second group of the strands are more dense than the intermediate density; constructing a wood composite material having two surface layers and one or more core layers, wherein the core layer contains at least about 70 wt % of the second group of the strands that are less dense than the intermediate density; and the surface layers contain at least about 70 wt % of the first group of the strands that are more dense than the intermediate density.

According to one aspect of this embodiment the method for producing the wood composite board further comprises the step of measuring the wood strands and determining an intermediate density.

DETAILED DESCRIPTION OF THE INVENTION

All parts, percentages and ratios used herein are expressed by weight unless otherwise specified. All documents cited herein are incorporated by reference.

As used herein, "wood" is intended to mean a cellular structure, having cell walls composed of cellulose and hemicellulose fibers bonded together by lignin polymer. It should further be noted that the term "wood" encompasses *lignocellulosic* material generally.

By "wood composite material" it is meant a composite material that comprises wood and one or more wood composite additives, such as adhesives or waxes. The wood is typically in the form of veneers, flakes, strands, wafers, particles, and chips. Non-limiting examples of wood composite materials include oriented strand board ("OSB"), waferboard, particle board, chipboard, medium-density fiberboard, plywood, parallel strand lumber, oriented strand lumber, and laminated strand lumbers. Common characteristic of the wood composite materials are that they are composite materials comprised of strands and ply veneers bound with polymeric resin and other special additives. As used herein, "flakes", "strands", "chips", "particles", and "wafers" are considered equivalent to one another and are used interchangeably. A non-exclusive description of wood composite materials may be found in the Supplement Volume to the Kirk-Othmer Encyclopedia of Chemical Technology, pp 765-810, 6$^{th}$ Edition.

The present invention is directed to wood composite material (especially wood composite boards and panels) comprising a combination of core and surface layers (for a total of three or more layers) in such a way that the strands in the core layer are made from a less dense wood species than the strands in the surface layer.

Several factors can affect the density of wood, and consequently the wood strands made from them. Some wood species simply are heavier and denser than other wood species. For example iron wood, oak and hickory are all known as being very heavy wood species, which is physically explained by their having smaller interior spaces in the wood lumen. On the other hand, less dense wood material is typically selected from trees that are less mature and that grow faster than other trees. This speed of growth may partially be the result of specially selecting certain genetic tree strains that are faster growing. But the speed of growth is particularly the result of the trees being grown on plantations where conditions are ideal for faster growth such as regular spacing, the clearing of brush and under growth, and consistent and managed fertilization and water, and care and tending.

However, the drawback of using fast-growing wood species with lower densities and higher fraction of juvenile wood is that such wood has a lower strength and stiffness. For example, low density lumber of a particular size is not as strong as higher density lumber of the same dimensions, therefore superior or comparable strength and stiffness performance must be obtained by cutting the low density wood into thicker pieces or using it in combination with higher density lumber materials.

The boards or panels prepared according to the present invention may be made in the form of a variety of different materials, such as wood or wood composite materials, such as oriented strand board ("OSB"). In addition to *paulownia*, these OSB panels also incorporate strands from other suitable wood species materials including naturally occurring hard or soft woods species, singularly or mixed, whether such wood is dry (having a moisture content of between 2 wt % and 12 wt %) or green (having a moisture content of between 30 wt % and 200 wt %).

In the present invention, the lower density strands are concentrated in the core layers and the higher density strands are concentrated in the surface layers. In this instance, the term "layer" or "layers" is meant to refer to a section of one wood species or density group, and is not necessarily a designation of strand orientation, although each layer may be oriented or random. Specifically, the wood strands in the present invention are divided by an "intermediate density", which divides the wood strands so that the top and bottom layers of the strands are more dense than the intermediate density, and the middle layer (or layers) of the strands are less dense than the intermediate density. The core layer contains at least about 70 wt % of the strands that are less dense than the intermediate density; and the upper and lower surface layers contain at least about 70 wt % of the strands that are more dense than the intermediate density.

The process for making wood composites according to the present invention is straightforward. In the first step, a quantity of wood strands is provided, the strands will typically be a mixture of two or more wood species, each having a different density. The strands are then divided based on an intermediate density (which can be determined in variety of ways all of which are well-known to a person of ordinary skill in the art) so that a first group of the strands are less dense than the intermediate density, and a second group of the strands are more dense than the intermediate density.

The strands are then distributed between the surface layers and the core layer, so that the core layer contains at least about 70 wt % of the strands that are less dense than the intermediate density; and the upper and lower surface layers contain at least about 70 wt % of the strands that are more dense than the intermediate density.

Although as used in the present application, there are no specific wood species to be designated as "low density" and "high density" strands, it is noted that materials like *paulownia*, and loblolly pine are of lower density than other wood species such as hickory or oak. It is to be expected that lower density strands such as *paulownia* are more likely to be included in the core layers of the wood composite panels.

One particular consequence regarding the increased concentration of lower density strands in a wood composite is that the wood composite material will be less dense. For example, conventional OSB boards meeting PS-2 standards will have a density in the range of about 35 lbs/ft³ to about 48 lbs/ft³; specifically, the density ranges from 40 lbs/ft³ to 48 lbs/ft³ for southern pine, and 35 lbs lbs/ft³ to 42 lbs/ft³ for Aspen. By contrast, in the present invention with the increased concentration of lower density strands, the density of the boards will range from 20 lbs/ft³ to about 60 lbs/ft³. Of course, the higher the fraction of lower density strands used in these mixed wood species composites, the lower the density of the board or panel.

Regardless of its density, the panel should have a thickness of about 0.6 cm (about ¼") to about 10.2 cm (about 4").

Typically, the raw wood starting materials, either virgin or reclaimed, are cut into strands, wafers or flakes of desired size and shape, which are well known to one of ordinary skill in the art. The strands are preferably more than 2 inches long, more than 0.3 inch wide, and less than 0.25 inch thick. While not intended to be limited by theory, it is believed that longer strands, i.e., longer than about 6 inches, improves the final product mechanical strength by permitting better alignment. It is also known that uniform-width strands are preferred for better product quality. Uniform strand geometry allows a manufacturer to optimize the manufacturer's process for each size of strand. For instance, if all the stands were 4 inches×1 inch, then the orienter could be optimized to align those strands within a single layer. If strands that were 1 inch long and 0.25 inch wide were added, some of those could slide thru the orienters sideways. Cross-oriented strands lower the overall mechanical strength/stiffness of the product.

After the strands are cut they are dried in an oven to a moisture content of about 1 to 20%, preferably between 2 to 18%, more preferably from 3 to about 15%, and then coated with one or more polymeric thermosetting binder resins, waxes and other additives. The binder resin and the other various additives that are applied to the wood materials are referred to herein as a coating, even though the binder and additives may be in the form of small particles, such as atomized particles or solid particles, which do not form a continuous coating upon the wood material. Conventionally, the binder, wax and any other additives are applied to the wood materials by one or more spraying, blending or mixing techniques, a preferred technique is to spray the wax, resin and other additives upon the wood strands as the strands are tumbled in a drum blender.

After being coated and treated with the desired coating and treatment chemicals, these coated strands are used to form a multi-layered mat. In a conventional process for forming a multi-layered mat, the coated wood materials are spread on a conveyor belt in a series of two or more, preferably three layers. Preferably, the strands are positioned on the conveyor belt as alternating layers where the "strands" in adjacent layers are oriented generally perpendicular to each other, but it is also understood by those skilled in the art that the products made from this process could have the strands aligned all in the same direction or randomly without a particular alignment.

Various polymeric resins, preferably thermosetting resins, may be employed as binders for the wood flakes or strands. Suitable polymeric binders include isocyanate resin, urea-formaldehyde, phenol formaldehyde, melamine formaldehyde ("MUF") and the co-polymers thereof. Isocyanates are the preferred binders, and preferably the isocyanates are selected from the diphenylmethane-p,p'-diisocyanate group of polymers, which have NCO— functional groups that can react with other organic groups to form polymer groups such as polyurea, —NCON—, and polyurethane, —NCOO—. 4,4-diphenyl-methane diisocyanate ("MDI") is preferred. A suitable commercial pMDI product is Rubinate 1840 available from Huntsman, Salt Lake City, Utah, and Mondur 541 pMDI available from Bayer Corporation, North America, of Pittsburgh, Pa. Suitable commercial MUF binders are the LS 2358 and LS 2250 products from the Dynea corporation.

The binder concentration is preferably in the range of about 1.5 wt % to about 20 wt %, more preferably about 2 wt % to about 10 wt %. A wax additive is commonly employed to enhance the resistance of the OSB panels to moisture penetration. Preferred waxes are slack wax or an emulsion wax. The wax loading level is preferably in the range of about 0.5 wt % to about 2.5 wt %.

After the multi-layered mats are formed according to the process discussed above, they are compressed under a hot press machine that fuses and binds together the wood materials to form consolidated OSB panels of various thickness and sizes. Preferably, the panels of the invention are pressed for 2-10 minutes at a temperature of about 100° C. to about 260° C.

The invention will now be described in more detail with respect to the following, specific, non-limiting examples.

EXAMPLES

Wood composite boards were prepared according to the present invention. Plantation-grown Loblolly pine logs (for making low density wood strands) and natural short leaf pine logs (for making non-low density wood strands) were obtained for use. The logs were then cut into strands of between 1 to 6 inches in length, 0.25 to 4 inches wide and about 0.025 inch thick. The strands were then dried and sorted and pressed into six different types of panels, with the strands oriented in a single direction, each with different combinations of strands as follows:

TABLE I

| # | Material | Loblolly/short leaf pine (wt. %) |
|---|---|---|
| 1 | Short leaf surface, loblolly core | 70/30 |
| 2 | Short leaf surface, loblolly core | 30/70 |
| 3 | Short leaf core, loblolly surface | 70/30 |
| 4 | Short leaf core, loblolly surface | 30/70 |
| 5 | Mixed throughout | 70/30 |
| 6 | Mixed throughout | 30/70 |

The % listed above the weight % of the species of strands used and their location in the panel. For example, panel number 1 uses 70 wt % of short leaf pine in the surface and 30 wt % loblolly in the core. In this instance, the layers are defined by the wood species used in that layer as opposed to an orientation of the strands within that layer.

(As listed in the tables above, the short leaf pine is actually 70% short leaf and 20% loblolly while the loblolly is 100% loblolly.) Panels No. 1-2 represent panels prepared according to the present invention, while panels no. 5-6 essentially represent the prior art. The strands were oriented in a single direction only (i.e., the core was oriented in the same direction as the surfaces). The panels in the above examples contained 5 wt % of Mondur G541 pMDI available from the Bayer Corporation, Pittsburgh, Pa., and emulsion wax was added at a level of 2% by weight of the wood with the wax solids at 58% of total.

The panels were then cut into smaller sizes and tested for several different wood composite performance characteristics according to the protocol specified in ASTM D1037. These performance characteristics included Modulus of Elasticity ("MOE", a measure of panel stiffness) in the parallel directions and Modulus of Rupture ("MOR", a measure of panel strength) in the parallel direction. The performance characteristics measured for both the prior art panels and the panels of the present invention are set forth in table II, below.

TABLE II

| Panels | Mixture type | MOE | MOR |
|---|---|---|---|
| 1-2 | Short leaf surface, loblolly core | 1185813 | 8125.0 |
| 3-4 | Loblolly surface, short leaf core | 1063099 | 7524.5 |
| 5-6 | Mixed Short leaf and loblolly | 1084803 | 7641.5 |

As can be seen in Table II, the OSB board prepared according to the present invention had significantly better performance characteristics than other boards, with the MOE and the MOR being significantly better than the prior art comparative boards.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A wood composite material comprising:
   wood strands disposed in first and second surface layers and one or more core layers, wherein about 70 wt % of the wood strands of the first and second surface layers are comprised of a wood species that has a density greater than a density of a wood species from which about 70 wt % of the strands in the one or more core layers are stranded.

2. The wood composite material according to claim 1, wherein the wood composite material is a board having a density of about 20 lbs/ft$^3$ to about 60 lbs/ft$^3$.

3. The wood composite material according to claim 1, wherein the strands in the one or more core layers are selected from the group consisting of oak species, hickory species, pine species, aspen species, and other hardwood and softwood species.

4. The wood composite material according to claim 1, wherein the wood composite material is in the form of an oriented strand board.

5. The wood composite material according to claim 1, wherein the wood composite material comprises from about 1 wt % to about 20 wt % of polymeric binders.

6. The wood composite material according to claim 5, wherein the wood composite board has a density of about 20 lbs/ft³ to about 40 lbs/ft³.

7. A wood composite board, comprising:
   upper and lower surface layers, wherein the upper and lower surface layers each comprise about 70 wt % of wood strands from a first wood species; and
   a core layer between the upper and lower surface layers, wherein the core layer comprises about 70 wt % of wood strands from a second wood species that is different than the first wood species,
   wherein the first wood species has a density that is greater than a density of the second wood species.

8. The wood composite board of claim 7, wherein the about 70 wt % of wood strands of the upper and lower surface layers are selected from the group consisting of iron wood, oak wood, natural short leaf pine wood, and hickory wood.

9. The wood composite board of claim 7 wherein the about 70 wt % of wood strands of the core layer is selected from the group consisting of loblolly pine wood and *paulownia* wood.

10. The wood composite board of claim 7, wherein the board has a density a density of about 20 lbs/ft³ to about 60 lbs/ft³.

11. The wood composite board of claim 7, wherein the board has a thickness of about 0.25 inches to about 4 inches.

12. The wood composite board of claim 7, wherein the wood strands of the upper, lower, and core layers generally all have lengths of at least about one to about six inches, widths of at least about 0.3 inches, and thicknesses no more than about 0.25 inches.

13. The wood composite board according to claim 7, wherein the wood composite board comprises from about 1 wt % to about 20 wt % of polymeric binders.

* * * * *